United States Patent
Yang et al.

(10) Patent No.: US 10,110,930 B2
(45) Date of Patent: Oct. 23, 2018

(54) ROBUST PACKET LOSS HANDLING IN RECORDING REAL-TIME VIDEO

(71) Applicant: Dialogic Corporation, Montreal (CA)

(72) Inventors: Kyeong Ho Yang, Freehold, NJ (US); Yisheng Zhao, Edison, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 93 days.

(21) Appl. No.: 14/790,092

(22) Filed: Jul. 2, 2015

(65) Prior Publication Data

US 2017/0006312 A1    Jan. 5, 2017

(51) Int. Cl.
*H04N 5/92*    (2006.01)
*H04N 19/895*    (2014.01)
*H04L 1/16*    (2006.01)
*H04N 19/172*    (2014.01)
*H04N 19/107*    (2014.01)
*H04N 19/166*    (2014.01)
*H04N 19/86*    (2014.01)
*H04N 19/169*    (2014.01)
*H04N 21/44*    (2011.01)
*H04N 21/4425*    (2011.01)

(52) U.S. Cl.
CPC ......... *H04N 19/895* (2014.11); *H04L 1/1607* (2013.01); *H04N 19/107* (2014.11); *H04N 19/166* (2014.11); *H04N 19/172* (2014.11); *H04N 19/188* (2014.11); *H04N 19/86* (2014.11); *H04N 21/44004* (2013.01); *H04N 21/4425* (2013.01)

(58) Field of Classification Search
CPC .......................... H04N 19/895; H04N 19/107
See application file for complete search history.

(56) References Cited

U.S. PATENT DOCUMENTS 9,490,850 B1 * 11/2016 Paniconi ............. H03M 13/353
2008/0062990 A1 * 3/2008 Oran ..................... H04L 1/1607
370/392
2014/0192825 A1 * 7/2014 Wang ..................... H04L 49/55
370/475

OTHER PUBLICATIONS

"RTP: A Transport Protocol for Real-Time Applications", http://tools.ietf.org/pdf/rfc3550.pdf, Jul. 2003.
"Extended RTP Profile for Real-time Transport Control Protocol (RTCP)-Based Feedback (RTP/AVPF)", http://tools.ietf.org/pdf/rfc4585.pdf, Jul. 2006.

(Continued)

*Primary Examiner* — Hung Dang
*Assistant Examiner* — Girumsew Wendmagegn
(74) *Attorney, Agent, or Firm* — BainwoodHuang

(57) ABSTRACT

Improved systems and methods of video decoding and recording in real-time video communications for use in lossy network environments. The disclosed systems and methods can employ a plurality of wait time thresholds for retransmission of missing video packets, based at least on the processing performed on the respective video packets, such processing including video decoding in a real-time video communication between client devices, and video recording and storing in a video file. The disclosed system and methods can also adaptively perform error concealment on video frames in the bitstream domain prior to recording and storing encoded video frame data in a video file, based at least on estimates of the complexities of the respective video frames.

11 Claims, 13 Drawing Sheets

(56) References Cited

OTHER PUBLICATIONS

"RTP Retransmission Payload Format", http://tools.ietf.org/pdf/rfc4588.pdf, Jul. 2006.

Y. Wang and Q.-F. Zhu, "Error control and concealment for video communication: a review," Proceedings of the IEEE, vol. 86, pp. 974-997, May 1998.

Stefan Holmer, Mikhal Shemer, and Marco Paniconi, "Handling Packet Loss in WebRTC", in Proceedings of IEEE International Conference on Image Processing (ICIP 2013), pp. 1860-1864.

ISO/IEC 14496-12, Information technology—Coding of audio-visual objects—Part 12: ISO base media file format, 2012.

\* cited by examiner

ROBUST PACKET LOSS HANDLING IN RECORDING REAL-TIME VIDEO

TECHNICAL FIELD

The present application relates generally to systems and methods of video decoding and recording in video communications, and more specifically to systems and methods of video decoding and recording in real-time video communications in lossy network environments.

BACKGROUND

In recent years, real-time video communications have been increasingly employed not only by business enterprises of various sizes, but also government, educational, and healthcare institutions, as well as individuals. It is often useful to generate recordings of such real-time video communications that take place between client devices over a network, tracking both the audio and video produced by the respective devices in a single video file. Such recordings of real-time video communications between client devices can serve as valuable resources for reviewing and/or evaluating the level or quality of customer experience, service quality assurance, liability protection, etc., as well as for capturing accurate records of complete video interactions between the client devices.

The generation of recordings of real-time video communications between client devices can be problematic, however, because such real-time video communications typically take place at least in part over public networks such as the Internet, which generally operates as a packet network that employs the transmission control protocol (TCP)/Internet protocol (IP) stack of protocols for packet transmission. In such real-time video communications, the user datagram protocol (UDP) is typically used at the transport layer to deliver video packets at a specified rate. Further, the real-time transport protocol (RTP) is typically used in conjunction with the UDP to handle various functions such as data identification, sequence numbering, time stamping, and/or packet delivery monitoring.

However, using UDP/RTP video packets in real-time video communications has drawbacks because, while the UDP can deliver such UDP/RTP video packets at a specified rate, it generally cannot guarantee lossless delivery of the video packets. This can pose a problem for the generation of recordings of such real-time video communications because video players or other devices that attempt to decode encoded video frame data from video files containing such recordings may crash if the encoded video frame data has one or more missing video packets.

It would therefore be desirable to have improved systems and methods of video decoding and recording in real-time video communications in lossy network environments.

SUMMARY

In accordance with the present application, improved systems and methods of video decoding and recording in real-time video communications are disclosed for use in lossy network environments. The disclosed systems and methods can employ a plurality of wait time thresholds for retransmission of missing video packets, based at least on the processing performed on the respective video packets, such processing including video decoding in real-time video communications between client devices, and video recording and storing in video files. The disclosed system and methods can also adaptively perform error concealment on video frames in the bitstream domain prior to recording and storing encoded video frame data in video files, based at least on estimates of the complexities of the respective video frames.

In one aspect, a system for video decoding and recording in real-time video communications includes a client device functioning as a video sender, and another client device functioning as a video receiver, in which the video sender and the video receiver are communicably coupled to one another by at least one network such as the Internet. The video sender includes a video encoder, a video packetizer, and a network adaptor, which, in turn, includes a video packet transmission/retransmission buffer (also referred to herein as the "transmission/retransmission buffer"). The video receiver includes a network adaptor with a jitter buffer, a video depacketizer, a video decoder, and a video recorder, which, in turn, includes an error concealer. In an exemplary aspect, the network adaptor of the video receiver can further include a missing packet detector, a wait time monitor, a Generic Negative Acknowledgement (GNACK) message transmitter, and a Picture Loss Indication (PLI) message transmitter. The video sender can receive, generate, or otherwise obtain a sequence of video frames (also referred to herein as a/the "video sequence") at the video encoder, which is operative to encode data of the respective video frames, and to provide the encoded video frame data to the video packetizer. The video packetizer is operative to packetize the encoded video frame data into one or more video packets, and to provide the video packets to the transmission/retransmission buffer of the network adaptor, which is operative to transmit, over the network, the video packets from the transmission/retransmission buffer to the video receiver. The video receiver can receive or otherwise obtain the video packets transmitted over the network, and temporarily store the video packets in the jitter buffer of its network adaptor, which is operative to provide the video packets from the jitter buffer to the video depacketizer. The video depacketizer is operative to reconstruct the encoded video frame data from the video packets, and to provide the encoded video frame data in a video frame bitstream to the video decoder. The video decoder is operative to decode the video frame bitstream in order to obtain video frames, and to provide the video frames in the video sequence for viewing by a human user on a display of the client device, or for further processing in another functional module or component, such as re-encoding the video data for transmission over the network to a client device of another party. The video depacketizer is further operative to provide the encoded video frame data to the video recorder for storage in a video file within a suitable video storage area.

In one mode of operation, in a real-time video communication between the video sender and the video receiver, one or more video packets are received at the network adaptor of the video receiver over the network from the video sender, and the video packets are temporarily stored in the jitter buffer of the network adaptor. A determination is then made, by the missing packet detector, as to whether the received video packets have any missing video packets, which can be indicative of an eventual packet loss at the video receiver. For example, the missing packet detector can detect such missing video packets by inspecting the sequence numbers of the video packets stored in the jitter buffer. In the event no missing video packets are detected, encoded video frame data are reconstructed from the video packets by the video depacketizer, and the encoded video frame data are decoded by the video decoder in order to obtain video frames. The video frames are then provided in a video sequence for viewing by a human user on a display of the client device, or for further processing in another functional module or component, such as re-encoding the video data for transmission over the network to a client device of another party. In addition, a determination is made, at the video recorder, as to whether a recording of the video frame bitstream is desired. In the event a recording of the video frame bitstream is desired, the video frame bitstream is recorded and stored by the video recorder in a video file.

In the event one or more missing video packets are detected, a wait time clock is initialized by the wait time monitor, and at least one request (e.g., a GNACK message) for retransmission of the missing video packets is transmitted, by the GNACK message transmitter, over the network to the video sender. One or more video packets are further received at the network adaptor of the video receiver over the network from the video sender, and the video packets are temporarily stored in the jitter buffer. A further determination is then made, by the missing packet detector, as to whether the received video packets have any missing video packets. In the event no missing video packets are detected, (1) encoded video frame data are reconstructed by the video depacketizer, (2) the encoded video frame data are decoded by the video decoder in order to obtain video frames, and (3) the video frames are provided in the video sequence for viewing by the human user on the display of the client device, or for further processing in another functional module or component, such as re-encoding the video data for transmission over the network to a client device of another party. In addition, a further determination is made, at the video recorder, as to whether a recording of the video frame bitstream is desired. In the event a recording of the video frame bitstream is desired, the video frame bitstream is recorded and stored by the video recorder in the video file.

In the event one or more missing packets are further detected, a determination is made, by the wait time monitor, as to whether an elapsed time, $T_{wait}$, of the wait time clock exceeds a first wait time threshold, $THR_{wait\_dec}$. In the event the elapsed time, $T_{wait}$, of the wait time clock does not exceed the first wait time threshold, $THR_{wait\_dec}$, at least one further request (e.g., a GNACK message) for retransmission of the missing video packets is transmitted, by the GNACK message transmitter, over the network to the video sender. In the event the elapsed time, $T_{wait}$, of the wait time clock exceeds the first wait time threshold, $THR_{wait\_dec}$, at least one request (e.g., a PLI message) for transmission of an I-frame is transmitted, by the PLI message transmitter, over the network to the video sender. Further, the video decoder is directed, by the video depacketizer, to at least temporarily stop decoding encoded video frame data until the requested I-frame is received and processed at the network adaptor of the video receiver.

Having determined that a recording of the video frame bitstream is desired, a determination is made, by the wait time monitor, as to whether the elapsed time, $T_{wait}$, of the wait time clock exceeds a second wait time threshold, $THR_{wait\_rec}$, in which the second wait time threshold, $THR_{wait\_rec}$, is greater than the first wait time threshold, $THR_{wait\_dec}$. In the event the elapsed time, $T_{wait}$, of the wait time clock does not exceed the second wait time threshold, $THR_{wait\_rec}$, at least one further request (e.g., a GNACK message) for retransmission of the missing video packets can be transmitted, by the GNACK message transmitter, over the network to the video sender. In the event the elapsed time, $T_{wait}$, of the wait time clock exceeds the second wait time threshold, $THR_{wait\_rec}$, a determination is made as to whether at least one request (e.g., a PLI message) for transmission of an I-frame has already been transmitted by the PLI message transmitter. In the event a request for transmission of an I-frame has not already been transmitted by the PLI message transmitter, at least one request (e.g., a PLI message) for transmission of the I-frame is transmitted, by the PLI message transmitter, over the network to the video sender. The video recorder is then directed, by the video depacketizer, to at least temporarily stop recording and storing the video frame bitstream until the requested I-frame is received and processed at the network adaptor of the video receiver.

In a further mode of operation, if an eventual packet loss is determined at the video receiver, such as by a determination that video packets received at the video receiver have one or more missing video packets, possibly resulting in one or more incomplete video frames, then the error concealer of the video recorder may be employed to perform error concealment on the incomplete video frames in the bitstream domain, prior to recording and storing the encoded video frame data in a video file. In this further mode of operation, in a real-time video communication between the video sender and the video receiver, one or more video packets are received at the network adaptor of the video receiver over the network from the video sender. The video packets are temporarily stored in the jitter buffer, and encoded video frame data are reconstructed from the video packets by the video depacketizer. The error concealer of the video recorder is then informed by the video depacketizer of whether the encoded video frame data is incomplete. In the event the encoded video frame data is determined not to be incomplete (i.e., no video packets are missing from the encoded video frame data), a video frame bitstream that includes the video frame (such a video frame being a complete video frame) is recorded and stored by the video recorder in a video file.

In the event the encoded video frame data is determined to be incomplete, the error concealer of the video recorder can perform error concealment on the incomplete video frame in the bitstream domain, as follows. First, missing MBs in the data of the video frame are identified, and motion vectors (MVs) are estimated for the missing MBs. For example, the error concealer can estimate such MVs for the missing MBs in the encoded video frame data, using any suitable temporal error concealment technique. Using the estimated MVs for the missing MBs, a video frame bitstream that corresponds to the missing MBs is generated. The bitstream that corresponds to the missing MBs is then incorporated into the depacketized video frame bitstream provided by the video depacketizer, thereby generating a video frame bitstream that corresponds to a complete video frame. A video frame bitstream that includes the complete video frame is then recorded and stored by the video recorder in a video file.

In another mode of operation, if an eventual packet loss is determined at the video receiver, then the error concealer of the video recorder may be employed to adaptively perform error concealment on one or more incomplete video frames in the bitstream domain, prior to recording and storing a corresponding video frame bitstream in a video file. In this mode of operation, in a real-time video communication between the video sender and the video receiver, one or more video packets are received at the network adaptor of the video receiver over the network from the video sender. The video packets are temporarily stored in the jitter buffer, and encoded video frame data are reconstructed from the video packets by the video depacketizer. The error concealer of the video recorder is then informed by the video depacketizer of whether the encoded video frame data is incomplete. In the event the encoded video frame data is determined not to be incomplete (i.e., no video packets are missing from the encoded video frame data), a video frame bitstream that includes the video frame (such a video frame being a complete video frame) is recorded and stored by the video recorder in a video file.

In the event the encoded video frame data is determined to be incomplete, the error concealer of the video recorder can adaptively perform error concealment on the incomplete video frame in the bitstream domain, as follows. First, the complexity of the video frame is estimated, using any suitable video frame complexity estimation technique. In an exemplary aspect, the complexity of the video frame can be estimated using (1) the ratio of missing MBs to existing MBs in the respective video frame, (2) the average quantization step size employed for the existing MBs in the respective video frame, (3) the average number of bits per MB, (4) the average number of bits for MVs per MB, and/or (5) the average number of bits for video transform coefficients per MB. A determination is then made as to whether the complexity of the video frame exceeds a predetermined video frame complexity threshold, $THR_{complexity}$. In the event the complexity of the video frame does not exceed the predetermined video frame complexity threshold, $THR_{complexity}$, the error concealer of the video recorder performs error concealment on the incomplete video frame in the bitstream domain to generate a video frame bitstream that corresponds to a complete video frame, and the video frame bitstream is recorded in a video file.

In the event the complexity of the video frame exceeds the predetermined video frame complexity threshold, $THR_{complexity}$, the video frame is dropped by the error concealer of the video recorder. Once the video frame is dropped, all of the ensuing video frames are dropped until the next I-frame is received. One or more video packets are received at the network adaptor of the video receiver over the network from the video sender, the video packets are temporarily stored in the jitter buffer, and encoded video frame data are reconstructed from the video packets by the video depacketizer. The encoded video frame data are then received and parsed, by the error concealer of the video recorder, to determine whether the video frame is an I-frame. In the event the video frame is not an I-frame, the video frame is dropped by the error concealer of the video receiver. Further, one or more additional video packets are received at the network adaptor of the video receiver, and data of at least one additional video frame is reconstructed from the received video packets for further determination as to whether the respective video frame is an I-frame. In the event the video frame is an I-frame, a determination is made as to whether or not the I-frame bitstream is incomplete. Based on the determination as to whether or not the I-frame bitstream is incomplete, the error concealer of the video recorder adaptively performs error concealment on the incomplete I-frame in the bitstream domain, or a video frame bitstream that includes the I-frame (such an I-frame being a complete video frame) is recorded and stored by the video recorder in the video file.

In a further aspect, a system for playing back recorded real-time video communications includes a client device functioning as a video player, and another client device functioning as a video receiver, in which the video player and the video receiver are communicably coupled to one another by at least one network such as the Internet. The video player includes a video file parser, an error concealment information extractor, a video packetizer, and a network adaptor. The video player can receive, generate, or otherwise obtain a video file containing a recorded real-time video communication at the video file parser, which is operative to parse the video file to obtain data of at least one encoded video frame from a video frame bitstream stored in the video file. The error concealment information extractor is operative to extract error concealment information, if any, from the data of the encoded video frame. In an exemplary aspect, such error concealment information can include (1) the video frame type, (2) a flag that indicates whether or not the video frame was subjected to error concealment, and/or, (3) in the event the video frame was subjected to error concealment, the complexity of the video frame. For example, such error concealment information can be stored in at least one predetermined field of a media container of the received video file. The video packetizer is operative to packetize the encoded video frame data into one or more video packets, and to provide the video packets to the network adaptor, which is operative to transmit the video packets to the video receiver over the network.

In one mode of operation, a video file containing a recorded real-time video communication is received at the video file parser of the video player. The video file is parsed, by the video file parser, to obtain data of at least one encoded video frame from a video frame bitstream stored in the video file. Error concealment information, if any, is extracted from the data of the encoded video frame by the error concealment information extractor. A determination is then made, by the error concealment information extractor, as to whether error concealment was performed on the video frame, based on any error concealment information that was extracted from the data of the encoded video frame. In the event error concealment was not performed on the video frame, the encoded video frame data is packetized, by the video packetizer, into one or more video packets, and the video packets are transmitted, by the network adaptor, to the video receiver over the network.

In the event error concealment was performed on the video frame, a determination is made, by the error concealment information extractor, as to whether or not to playback the recorded video frame. In an exemplary aspect, the determination as to whether or not to playback the recorded video frame can be made based on the distance (in seconds) to the next I-frame, as well as the complexity of the video frame. In the event the determination is made to playback the recorded video frame, the encoded video frame data is packetized, by the video packetizer, into one or more video packets, and the video packets are transmitted, by the network adaptor, to the video receiver over the network. In the event the determination is made not to playback the recorded video frame, the video frame is dropped by the error concealment information extractor. Further, data of at least one encoded video frame is obtained, by the video file parser, from the bitstream stored in the video file. A determination is then made, by the video file parser, as to whether the video frame is an I-frame. In the event the video frame is not an I-frame, the video frame is dropped by the video file parser. Further, data of at least one additional encoded video frame is obtained, by the video file parser, from the bitstream stored in the video file for further determination as to whether the respective video frame is an I-frame. In the event the video frame is an I-frame, error concealment information, if any, is extracted from the data of the I-frame by the error concealment information extractor. A determination is then made, by the error concealment information extractor, as to whether error concealment was performed on the I-frame, based on any error concealment information that was extracted from the data of the I-frame. Based on the determination as to whether error concealment was performed on the I-frame, the error concealment information extractor determines whether or not to drop the I-frame, or the I-frame is packetized and transmitted over the network to the video receiver.

By employing a plurality of wait time thresholds for retransmission of missing video packets of encoded video frame data, based at least on the processing performed on the respective video packets, such processing including video decoding in a real-time video communication between client devices, and video recording and storing in a video file, recordings of real-time video communications can advantageously be obtained with increased efficiency. Moreover, by adaptively performing error concealment on video frames prior to recording and storing a corresponding video frame bitstream in a video file, based at least on estimates of the complexities of the respective video frames, visible artifacts in recorded real-time video communications during playback of the video file can advantageously be reduced.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIG. 1b is a block diagram of an exemplary network adaptor of an exemplary video receiver included in the system of FIG. 1a;

FIG. 2a is a flow diagram of an exemplary method of video decoding in a real-time video communication in a lossy network environment, using the system of FIG. 1a;

FIG. 2b is a flow diagram of an exemplary method of video recording in a real-time video communication in a lossy network environment, using the system of FIG. 1a;

FIGS. 2c and 2d illustrate a flow diagram of an exemplary combined method of video decoding and recording in a real-time video communication in a lossy network environment, using the system of FIG. 1a;

FIG. 4 is a block diagram of exemplary macroblocks (MBs) and their corresponding motion vectors in data of an exemplary video frame, for use in describing exemplary functionality of the system of FIG. 1a;

FIGS. 5a and 5b illustrate a flow diagram of an exemplary method of adaptively performing error concealment on video frames in the bitstream domain, prior to recording and storing a corresponding video frame bitstream in a video file, using the system of FIG. 1a;

DETAILED DESCRIPTION

Improved systems and methods of video decoding and recording in real-time video communications are disclosed for use in lossy network environments. The disclosed systems and methods can employ a plurality of wait time thresholds for retransmission of missing video packets, based at least on the processing performed on the respective video packets, such processing including video decoding in real-time video communications between client devices, and/or video recording and storing in video files. The disclosed system and methods can also adaptively perform error concealment on video frames in the bitstream domain prior to recording and storing encoded video frame data in video files, based at least on estimates of the complexities of the respective video frames.

Figure 1A:
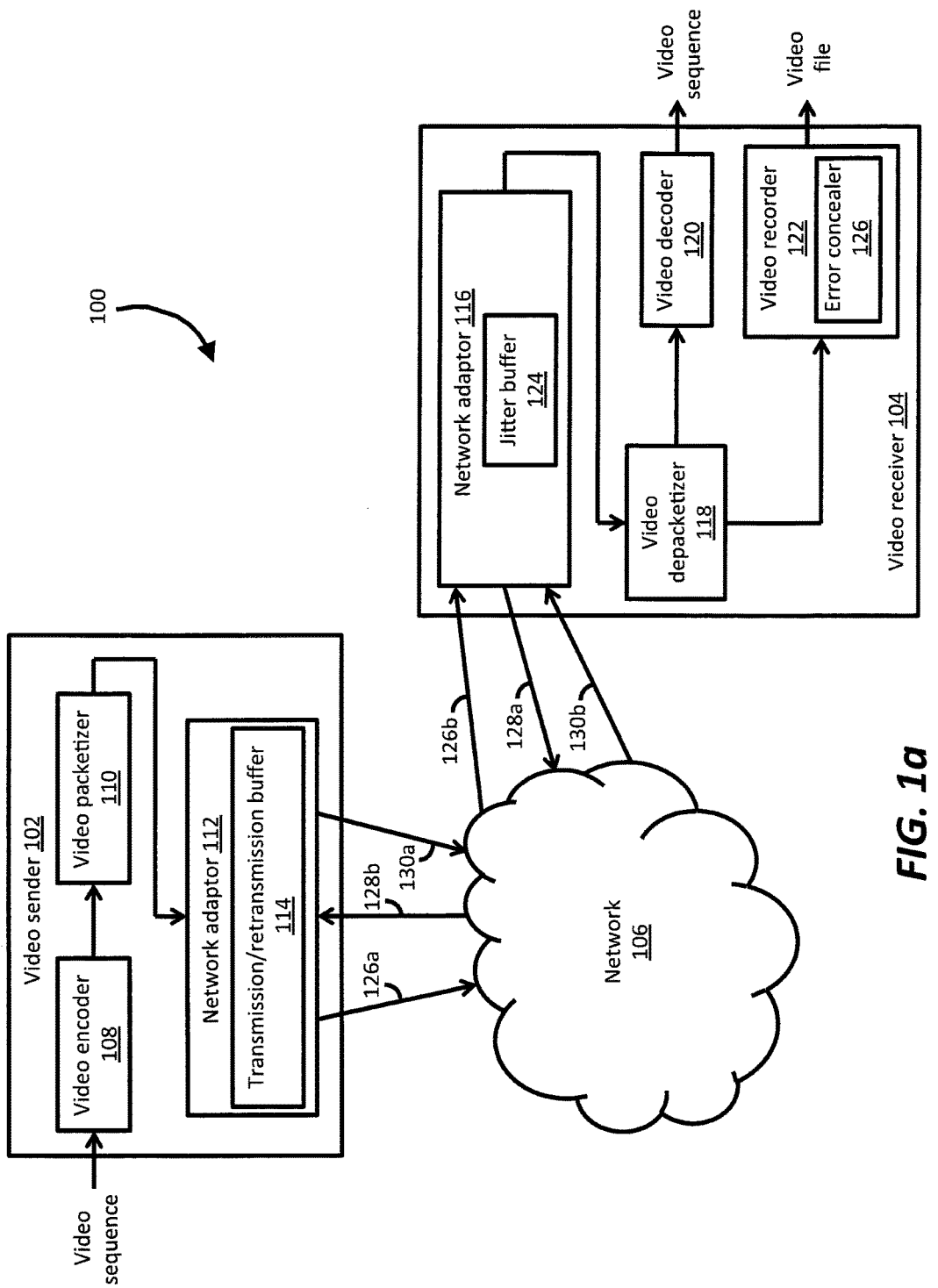
FIG. 1a is a block diagram of an exemplary system for video decoding and recording in real-time video communications between client devices, in accordance with the present application.

FIG. 1a depicts an illustrative embodiment of an exemplary system 100 for video decoding and recording in real-time video communications, in accordance with the present application. As shown in FIG. 1a, the system 100 includes a client device functioning as a video sender 102, and another client device functioning as a video receiver 104, in which the video sender 102 and the video receiver 104 are communicably coupled to one another by at least one network 106, such as the Internet. The video sender 102 includes a video encoder 108, a video packetizer 110, and a network adaptor 112, which, in turn, includes a video packet transmission/retransmission buffer 114 (also referred to herein as the "transmission/retransmission buffer"). The video receiver 104 includes a network adaptor 116 with a jitter buffer 124, a video depacketizer 118, a video decoder 120, and a video recorder 122, which, in turn, includes an error concealer 126.

In a real-time video communication between the video sender 102 and the video receiver 104, the video sender 102 can receive, generate, or otherwise obtain a sequence of video frames (also referred to herein as a/the "video sequence") at the video encoder 108, which is operative to encode data of the respective video frames, and to provide the encoded video frame data to the video packetizer 110. The video packetizer 110 is operative to packetize the encoded video frame data into one or more video packets, and to provide the video packets to the transmission/retransmission buffer 114 of the network adaptor 112. The network adaptor 112 is operative to transmit, over the network 106, the video packets from the transmission/retransmission buffer 114 to the video receiver 104. The video receiver 104 can receive or otherwise obtain the video packets transmitted over the network 106, and temporarily store the video packets in the jitter buffer 124 of its network adaptor 116. The network adaptor 116 is operative to provide the video packets from the jitter buffer 124 to the video depacketizer 118. The video depacketizer 118 is operative to reconstruct the encoded video frame data from the video packets, and to provide the encoded video frame data in a video frame bitstream to the video decoder 120. The video decoder 120 is operative to decode the encoded video frame data in order to obtain video frames, and to provide the video frames in the video sequence for viewing by a human user on a display of the client device, or for further processing in another functional module or component, such as re-encoding the video data for transmission over the network 106 to a client device of another party. The video depacketizer 118 is further operative to provide the encoded video frame data to the video recorder 122 for storage in a video file within a suitable video storage area.

Figure 1B:
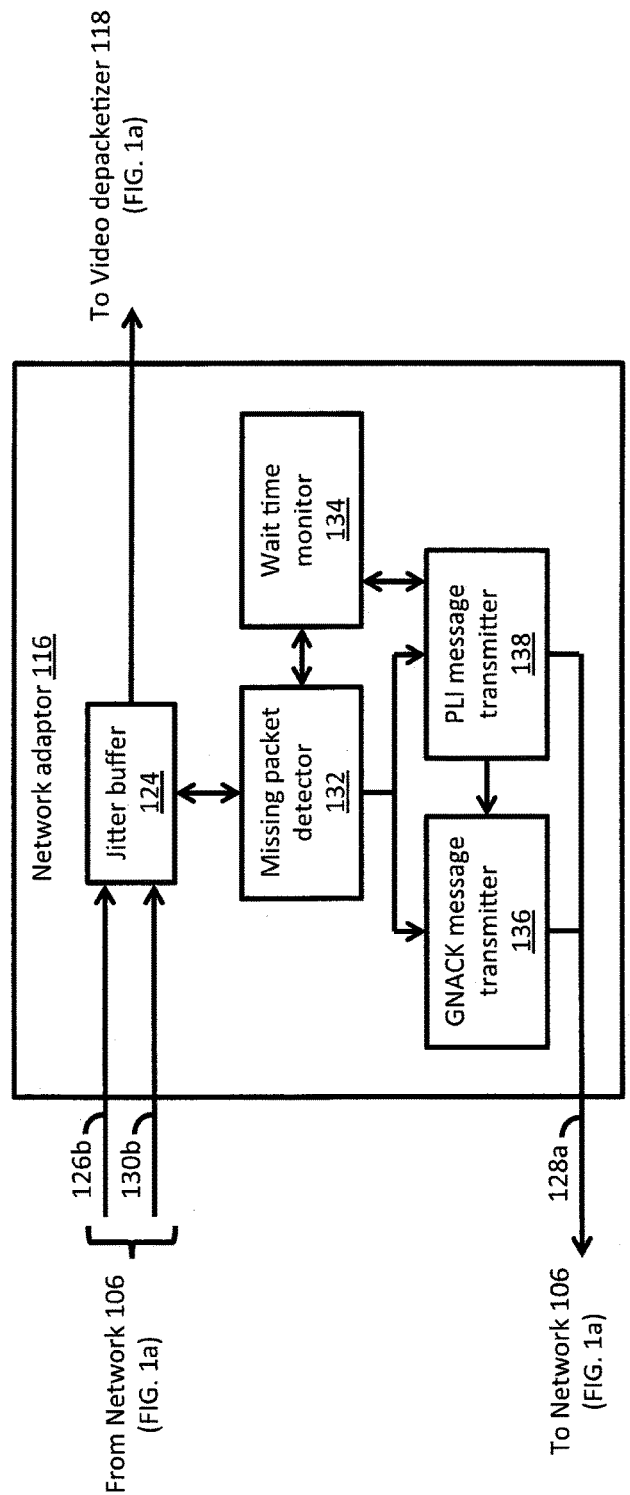

FIG. 1*b* depicts an illustrative embodiment of the network adaptor 116 of the video receiver 104 included in the system of FIG. 1*a*. As shown in FIG. 1*b*, the network adaptor 116 includes the jitter buffer 124, a missing packet detector 132, a wait time monitor 134, a Generic Negative Acknowledgement (GNACK) message transmitter 136, and a Picture Loss Indication (PLI) message transmitter 138.

Figure 2A:
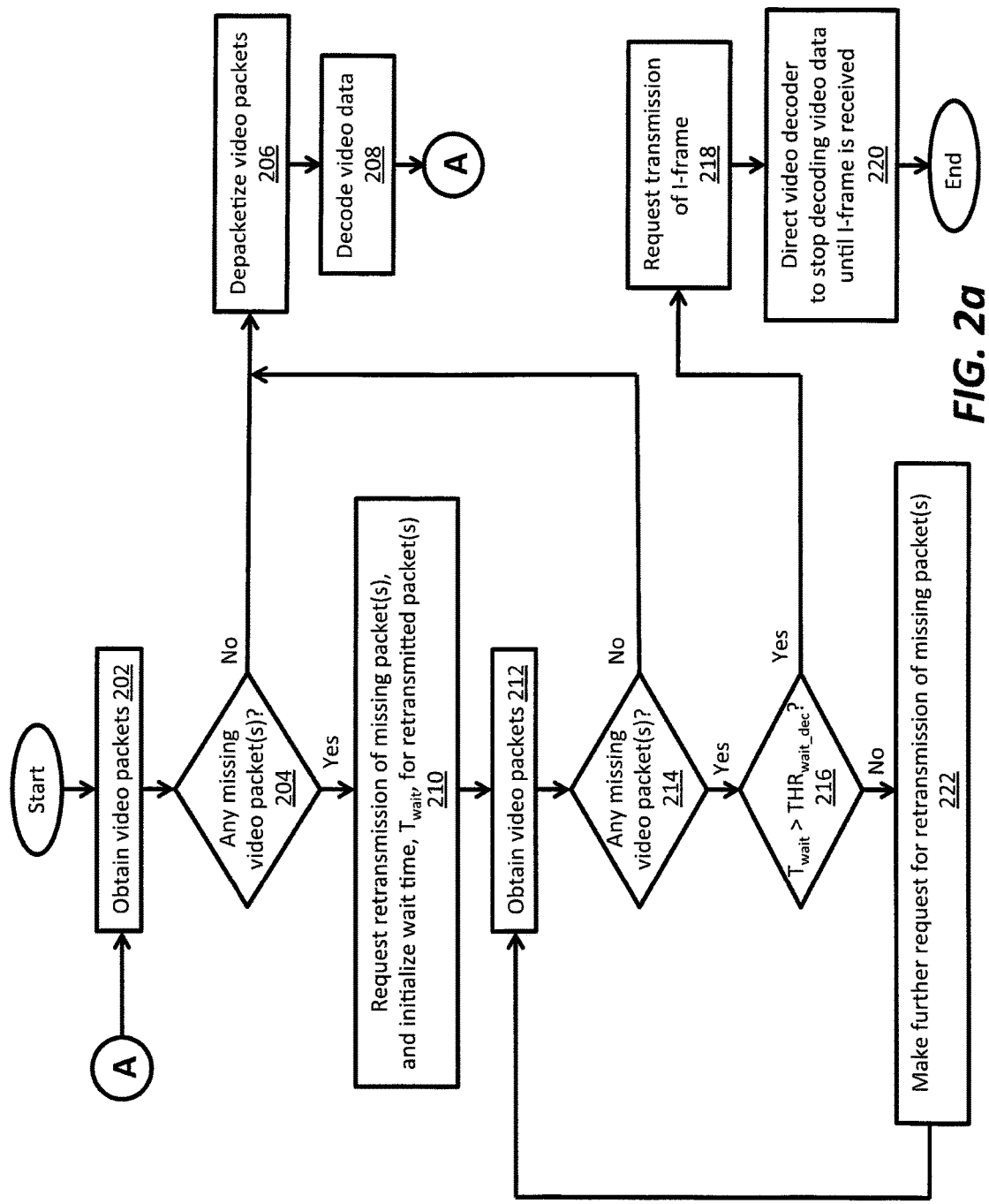

FIG. 2*a* depicts an exemplary method of video decoding in a real-time video communication in a lossy network environment, using the system 100 of FIG. 1*a*. As depicted in block 202, one or more video packets are received or otherwise obtained, substantially in real-time, at the network adaptor 116 of the video receiver 104 over the network 106 from the video sender 102. For example, the video sender 102 can transmit such video packets over a wired and/or wireless communication path 126*a* to the network 106, and over a wired and/or wireless communication path 126*b* from the network 106 to the network adaptor 116. Such video packets are temporarily stored in the jitter buffer 124 of the network adaptor 116. As depicted in block 204, a determination is made, by the missing packet detector 132 (see FIG. 1*b*), as to whether the received video packets have any missing video packets, which can be indicative of an eventual packet loss at the video receiver 104. For example, the missing packet detector 132 can detect such missing video packets by inspecting the sequence numbers of the video packets stored in the jitter buffer 124 (see also FIG. 1*b*). As depicted in block 206, in the event no missing video packets are detected, the received video packets are depacketized by the video depacketizer 118, and encoded video frame data are reconstructed from the video packets. As depicted in block 208, the encoded video frame data are decoded in order to obtain video frames. The video decoder 120 can provide the video frames in a video sequence for viewing by a human user on a display of the client device, or for further processing in another functional module or component, such as re-encoding the video data for transmission over the network 106 to a client device of another party. The method of FIG. 2*a* can then loop back from block 208 to block 202 for further receiving, substantially in real-time, one or more video packets at the network adaptor 116 of the video receiver 104 over the network 106 from the video sender 102.

As depicted in block 210, in the event one or more missing video packets are detected, a wait time clock is initialized (e.g., an elapsed time, $T_{wait}$, can be set to zero (0) or any other suitable value) by the wait time monitor 134, and at least one request, such as a real-time control protocol (RTCP) message (e.g., a GNACK message), for retransmission of the missing video packets is transmitted, by the GNACK message transmitter 136, over the network 106 to the video sender 102. For example, the GNACK message transmitter 136 can transmit such a GNACK message over a wired and/or wireless communication path 128*a* to the network 106, and over a wired and/or wireless communication path 128*b* from the network 106 to the network adaptor 112 of the video sender 102. Such a GNACK message can be configured to identify one or more video packets that have been detected as being missing at the video receiver 104, and to request the video sender 102 to retransmit the identified missing video packets to the video receiver 104.

As depicted in block 212, one or more video packets (including any retransmitted video packets) are received or otherwise obtained at the network adaptor 116 of the video receiver 104 over the network 106 from the video sender 102. For example, the network adaptor 112 of the video sender 102 can retransmit the video packets identified as being missing over a wired and/or wireless communication path 130*a* to the network 106, and over a wired and/or wireless communication path 130*b* from the network 106 to the network adaptor 116 of the video receiver 104. The received video packets are temporarily stored in the jitter buffer 124. As depicted in block 214, a determination is made, by the missing packet detector 132, as to whether the received video packets have any missing video packets. In the event no missing video packets are detected, the received video packets are depacketized (see block 206) by the video depacketizer 118, encoded video frame data are reconstructed from the video packets, and the encoded video frame data are decoded (see block 208) to YUV video frames by the video decoder 120. The method of FIG. 2*a* can then loop back from block 208 to block 202 for further receiving, substantially in real-time, one or more video packets at the network adaptor 116 of the video receiver 104 over the network 106 from the video sender 102.

As depicted in block 216, in the event one or more missing packets are detected, a determination is made, by the wait time monitor 134, as to whether the elapsed time, $T_{wait}$, of the wait time clock exceeds a first wait time threshold, $THR_{wait\_dec}$. For example, the value of the first wait time threshold, $THR_{wait\_dec}$, can be set as a function of the round trip delay between the video sender 102 and the video receiver 104, and can be optimized by a tradeoff between the overall delay and the eventual packet loss ratio at the video receiver 104. In the case of real-time video communications, a higher value for the first wait time threshold, $THR_{wait\_dec}$, can be used to decrease the eventual packet loss ratio while increasing the overall delay, and a lower value for the first wait time threshold, $THR_{wait\_dec}$, can be used to possibly increase the eventual packet loss ratio while decreasing the overall delay. Because the overall delay can be a significant performance factor in real-time communications, the first wait time threshold, $THR_{wait\_dec}$, can be set to a relatively small value, e.g., 500 milliseconds or lower, depending on the round trip delay between the video sender 102 and the video receiver 104.

As depicted in block 222, in the event the elapsed time, $T_{wait}$, of the wait time clock does not exceed the first wait time threshold, $THR_{wait\_dec}$, at least one further request (e.g., a GNACK message) for retransmission of the missing video packets is transmitted, by the GNACK message transmitter 136, over the network 106 to the video sender 102. As depicted in block 218, in the event the elapsed time, $T_{wait}$, of the wait time clock exceeds the first wait time threshold, $THR_{wait\_dec}$, at least one request, such as a real-time control protocol (RTCP) message (e.g., a PLI message), for transmission of an I-frame is transmitted, by the PLI message transmitter 138, over the network 106 to the video sender 102. For example, the PLI message transmitter 138 can transmit such a PLI message over the wired and/or wireless communication path 128*a* to the network 106, and over the wired and/or wireless communication path 128*b* from the network 106 to the network adaptor 112 of the video sender 102. Such a PLI message can be configured to indicate the loss of an unspecified amount of video packets, and to request the transmission of an intra-coded frame (also referred to herein as an/the "I-frame"). As depicted in block 220, the video decoder 120 is directed, by the video depacketizer 118, to at least temporarily stop decoding encoded video frame data until the requested I-frame is received and processed at the network adaptor 116 of the video receiver 104.

Figure 2B:
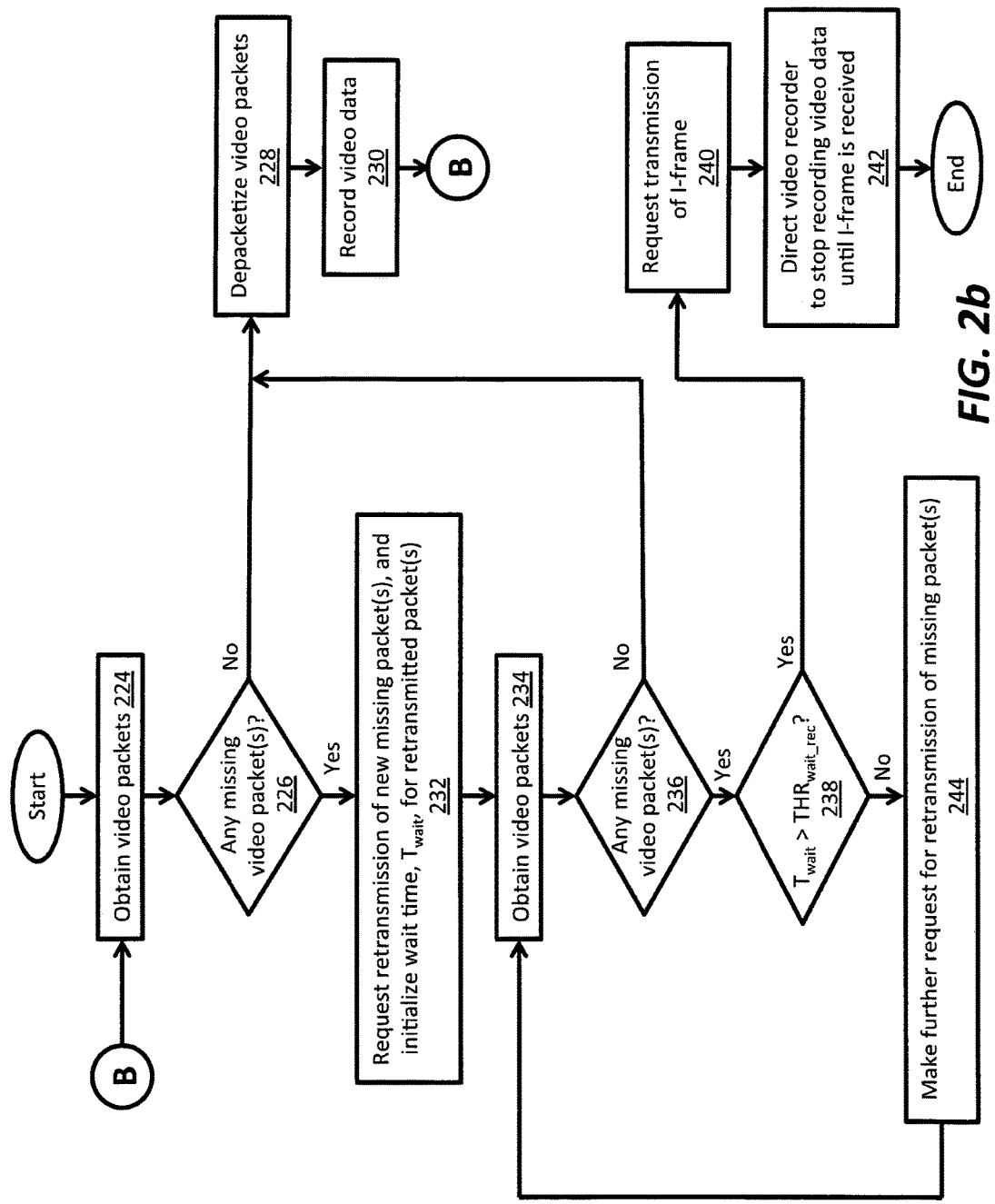

FIG. 2b depicts an exemplary method of video recording in a real-time video communication in a lossy network environment, using the system 100 of FIG. 1a. As depicted in block 224, one or more video packets are received or otherwise obtained, substantially in real-time, at the network adaptor 116 of the video receiver 104 over the network 106 from the video sender 102. Such video packets are temporarily stored in the jitter buffer 124 of the network adaptor 116. As depicted in block 226, a determination is made, by the missing packet detector 132 (see FIG. 1b), as to whether the received video packets have any missing video packets, which can be indicative of an eventual packet loss at the video receiver 104. As depicted in block 228, in the event no missing video packets are detected, the received video packets are depacketized by the video depacketizer 118, and encoded video frame data are reconstructed from the video packets. As depicted in block 230, the encoded video frame data is recorded and stored by the video recorder 122 in a video file. The method of FIG. 2b can then loop back from block 230 to block 224 for further receiving, substantially in real-time, one or more video packets at the network adaptor 116 of the video receiver 104 over the network 106 from the video sender 102.

As depicted in block 232, in the event one or more missing video packets are detected, the wait time clock is initialized (e.g., the elapsed time, $T_{wait}$, can be set to zero (0) or any other suitable value) by the wait time monitor 134, and at least one request (e.g., a GNACK message) for retransmission of the missing video packets is transmitted, by the GNACK message transmitter 136, over the network 106 to the video sender 102. As depicted in block 234, one or more video packets (including any retransmitted video packets) are received or otherwise obtained at the network adaptor 116 of the video receiver 104 over the network 106 from the video sender 102. The received video packets are temporarily stored in the jitter buffer 124. As depicted in block 236, a determination is made, by the missing packet detector 132, as to whether the received video packets have any missing video packets. In the event no missing video packets are detected, the received video packets are depacketized (see block 228) by the video depacketizer 118, encoded video frame data are reconstructed from the video packets, and the encoded video frame data is recorded and stored (see block 230) by the video recorder 122 in a video file. The method of FIG. 2b can then loop back from block 230 to block 224 for further receiving, substantially in real-time, one or more video packets at the network adaptor 116 of the video receiver 104 over the network 106 from the video sender 102.

As depicted in block 238, in the event one or more missing packets are detected, a determination is made, by the wait time monitor 134, as to whether the elapsed time, $T_{wait}$, of the wait time clock exceeds a second wait time threshold, $THR_{wait\_rec}$. For example, the second wait time threshold, $THR_{wait\_rec}$, can be greater than the first wait time threshold, $THR_{wait\_dec}$, or any other suitable value. Because the recording of a real-time video communication typically does not involve the concurrent viewing of the video in real-time, the second wait time threshold, $THR_{wait\_dec}$, can be set to a value that is greater than the value of the first wait time threshold, $THR_{wait\_dec}$, as follows:

$$THR_{wait\_rec} = \alpha * THR_{wait\_dec}, \quad (1)$$

in which "$\alpha$" is greater than one (1) (e.g., $\alpha=3$).

As depicted in block 244, in the event the elapsed time, $T_{wait}$, of the wait time clock does not exceed the second wait time threshold, $THR_{wait\_rec}$, at least one further request (e.g., a GNACK message) for retransmission of the missing video packets is transmitted, by the GNACK message transmitter 136, over the network 106 to the video sender 102. As depicted in block 240, in the event the elapsed time, $T_{wait}$, of the wait time clock exceeds the second wait time threshold, $THR_{wait\_rec}$, at least one request (e.g., a PLI message) for transmission of an I-frame is transmitted, by the PLI message transmitter 138, over the network 106 to the video sender 102. As depicted in block 242, the video recorder 122 is directed, by the video depacketizer 118, to at least temporarily stop recording and storing the encoded video frame data until the requested I-frame is received and processed at the network adaptor 116 of the video receiver 104.

Figure 2C:
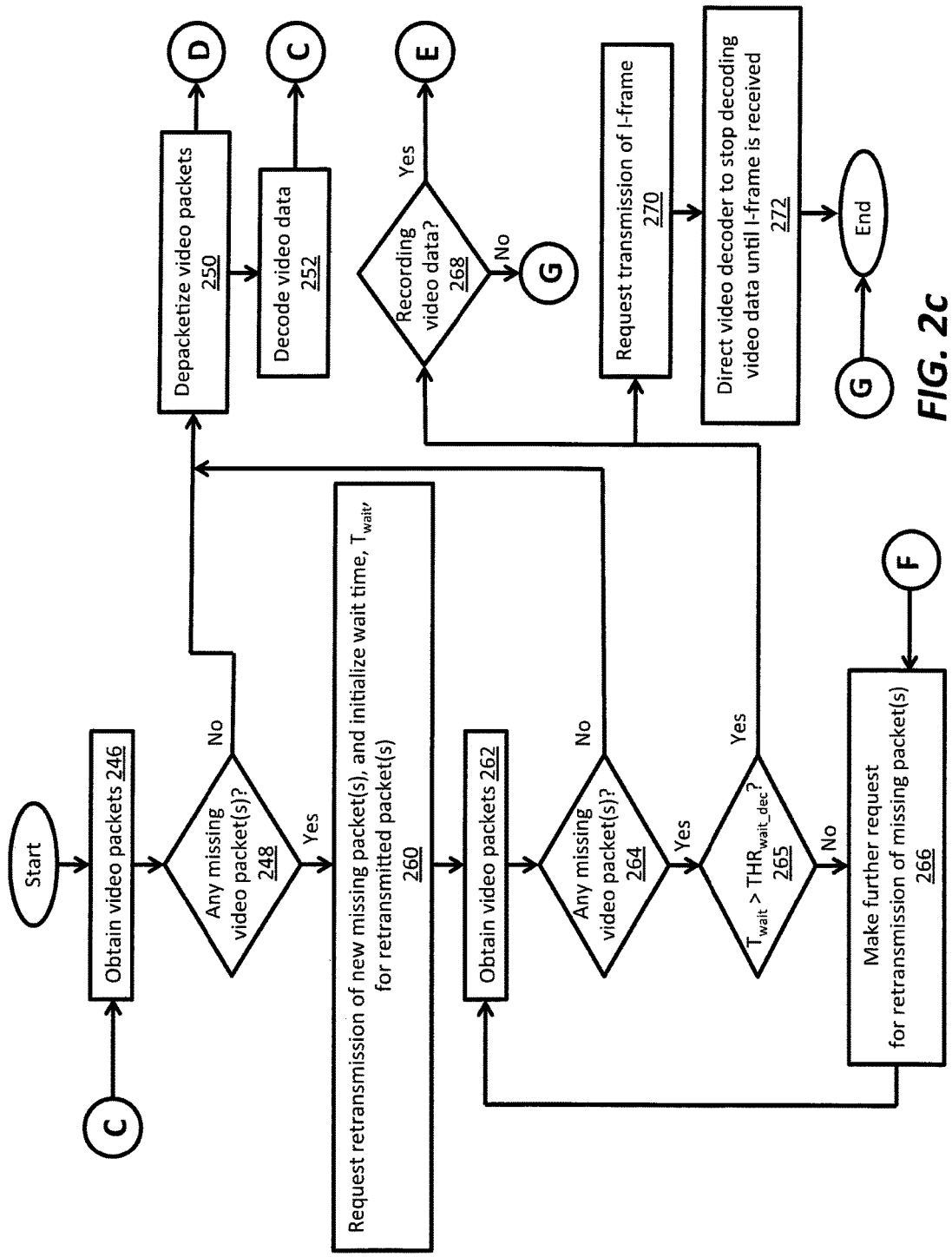
Figure 2D:
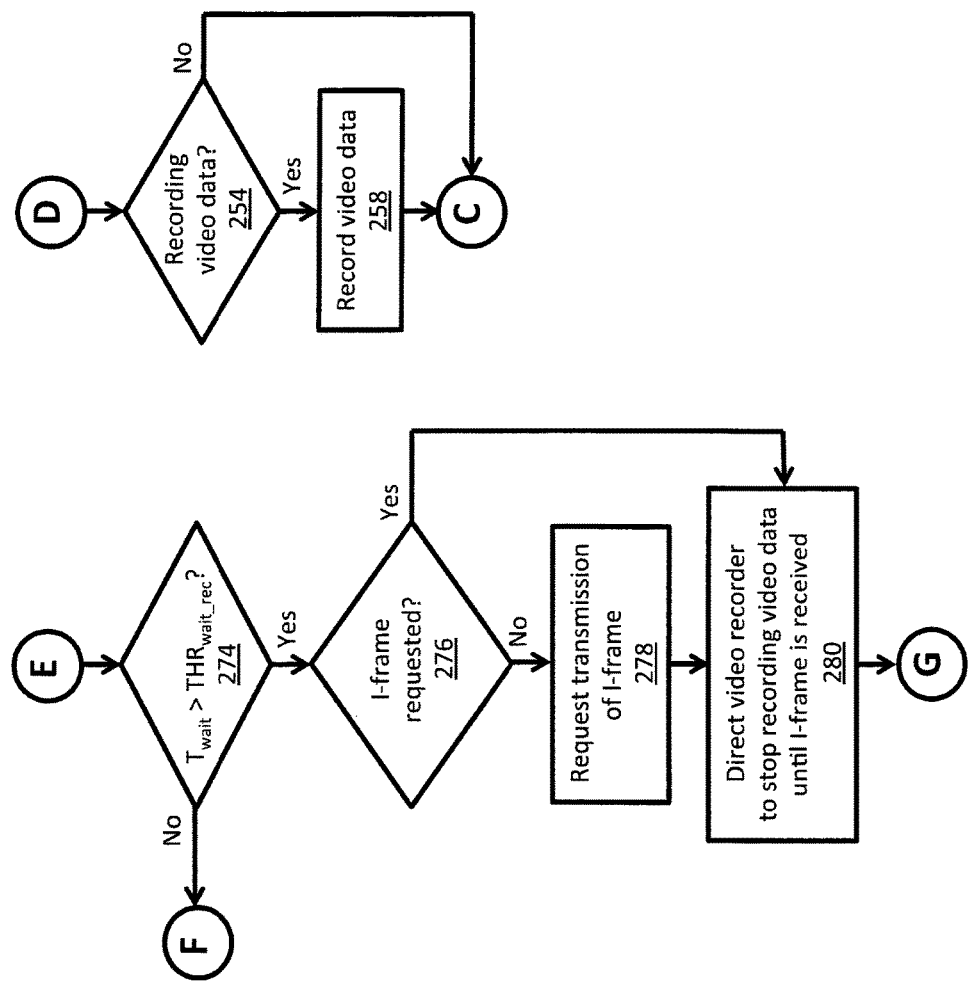

FIGS. 2c and 2d depict an exemplary combined method of video decoding and recording in a real-time video communication in a lossy network environment, using the system of FIGS. 1a and 1b. As depicted in block 246, one or more video packets are received, substantially in real-time, at the network adaptor 116 of the video receiver 104 over the network 106 from the video sender 102, and the video packets are temporarily stored in the jitter buffer 124 of the network adaptor 116. As depicted in block 248, a determination is then made, by the missing packet detector 132, as to whether the received video packets have any missing video packets, which can be indicative of an eventual packet loss at the video receiver 104. As depicted in block 250, in the event no missing video packets are detected, encoded video frame data are reconstructed from the video packets by the video depacketizer 118. As depicted in block 252, the encoded video frame data are decoded, by the video decoder 120, in order to obtain video frames. The video frames can be provided, by the video decoder 120, in a video sequence for viewing by a human user on a display of the client device, or for further processing in another functional module or component, such as re-encoding the video data for transmission over the network 106 to a client device of another party. As depicted in block 254 (see FIG. 2d), a determination is made, at the video recorder 122, as to whether a recording of the encoded video frame data is desired. As depicted in block 258, in the event a recording of the encoded video frame data is desired, the encoded video frame data is recorded and stored by the video recorder 122 in a video file. The method of FIGS. 2c and 2d can then loop back from block 258 to block 246 for further receiving, in substantially real-time, one or more video packets at the network adaptor 116 of the video receiver 104 over the network 106 from the video sender 102. In the event a recording of the encoded video frame data is not desired, the method of FIGS. 2c and 2d can likewise loop back from block 254 to block 246 for further receiving, in substantially real-time, one or more video packets at the network adaptor 116 of the video receiver 104 over the network 106 from the video sender 102.

As depicted in block 260, in the event one or more missing video packets are detected, the wait time clock is initialized (e.g., the elapsed time, $T_{wait}$, can be set to zero (0) or any other suitable value) by the wait time monitor 134, and at least one request (e.g., a GNACK message) for retransmission of the missing video packets is transmitted, by the GNACK message transmitter 136, over the network 106 to the video sender 102. As depicted in block 262, one or more video packets are further received at the network adaptor 116 of the video receiver 104 over the network 106 from the video sender 102, and the video packets are temporarily stored in the jitter buffer 124. As depicted in block 264, a further determination is then made, by the missing packet detector 132, as to whether the received video packets have any missing video packets. In the event no missing video packets are detected, the received video packets are depacketized (see block 250) by the video depacketizer 118, encoded video frame data are reconstructed from the video packets, the encoded video frame data are decoded (see block 252) by the video decoder 120 in order to obtain video frames. The video frames can be provided, by the video decoder 120, in the video sequence for viewing by the human user on the display of the client device, or for further processing in another functional module or component, such as re-encoding the video data for transmission over the network 106 to a client device of another party. A further determination is made (see block 254), at the video recorder 122, as to whether a recording of the encoded video frame data is desired. In the event a recording of the encoded video frame data is desired, the encoded video frame data is recorded (see block 258) and stored by the video recorder 122 in the video file. In the event a recording of the encoded video frame data is not desired, the method of FIGS. 2c and 2d can loop back to block 246 for further receiving, in substantially real-time, one or more video packets at the network adaptor 116 of the video receiver 104 over the network 106 from the video sender 102.

As depicted in block 265, in the event one or more missing packets are detected, a determination is made, by the wait time monitor 134, as to whether an elapsed time, $T_{wait}$, of the wait time clock exceeds the first wait time threshold, $THR_{wait\_dec}$. As depicted in block 266, in the event the elapsed time, $T_{wait}$, of the wait time clock does not exceed the first wait time threshold, $THR_{wait\_dec}$, at least one further request (e.g., a GNACK message) for retransmission of the missing video packets is transmitted, by the GNACK message transmitter 136, over the network 106 to the video sender 102. As depicted in block 270, in the event the elapsed time, $T_{wait}$, of the wait time clock exceeds the first wait time threshold, $THR_{wait\_dec}$, at least one request (e.g., a PLI message) for transmission of an I-frame is transmitted, by the PLI message transmitter 138, over the network 106 to the video sender 102. Further, as depicted in block 272, the video decoder 120 is directed, by the video depacketizer 118, to at least temporarily stop decoding encoded video frame data until the requested I-frame is received and processed at the network adaptor 116 of the video receiver 104. Further, as depicted in block 268, in the event the elapsed time, $T_{wait}$, of the wait time clock exceeds the first wait time threshold, $THR_{wait\_dec}$, a determination is made as to whether a recording of the encoded video frame data is desired. In the event a recording of the encoded video frame data is not desired, the method of FIGS. 2c and 2d can loop back to block 246 for further receiving, in substantially real-time, one or more video packets at the network adaptor 116 of the video receiver 104 over the network 106 from the video sender 102. As depicted in block 258, in the event a recording of the encoded video frame data is desired, the encoded video frame data is recorded and stored by the video recorder 122 in the video file. The method of FIGS. 2c and 2d can then likewise loop back to block 246 for further receiving, in substantially real-time, one or more video packets at the network adaptor 116 of the video receiver 104 over the network 106 from the video sender 102.

As depicted in block 274 (see FIG. 2d), in the event a recording of the encoded video frame data is desired (as determined in block 268; see FIG. 2c), a determination is made, by the wait time monitor 134, as to whether the elapsed time, $T_{wait}$, of the wait time clock exceeds the second wait time threshold, $THR_{wait\_rec}$, in which the second wait time threshold, $THR_{wait\_rec}$, is greater than the first wait time threshold, $THR_{wait\_dec}$. In the event the elapsed time, $T_{wait}$, of the wait time clock does not exceed the second wait time threshold, $THR_{wait\_rec}$, at least one further request (e.g., a GNACK message) for retransmission of the missing video packets (see block 266) can be transmitted, by the GNACK message transmitter 136, over the network 106 to the video sender 102. As depicted in block 276, in the event the elapsed time, $T_{wait}$, of the wait time clock exceeds the second wait time threshold, $THR_{wait\_rec}$, a further determination is made as to whether at least one request (e.g., a PLI message) for transmission of an I-frame has already been transmitted by the PLI message transmitter 138. For example, such a PLI message may have already been transmitted by the PLI message transmitter 138 in accordance with block 270. As depicted in block 278, in the event a request for transmission of an I-frame has not already been transmitted by the PLI message transmitter 138, at least one request (e.g., a PLI message) for transmission of the I-frame is transmitted, by the PLI message transmitter 138, over the network 106 to the video sender 102. As depicted in block 280, having transmitted the PLI message (or after having already transmitted the PLI message in block 270) over the network 106 to the video sender 102, the video recorder 122 is then directed, by the video depacketizer 118, to at least temporarily stop recording and storing the encoded video frame data until the requested I-frame is received and processed at the network adaptor 116 of the video receiver 104.

Figure 3:
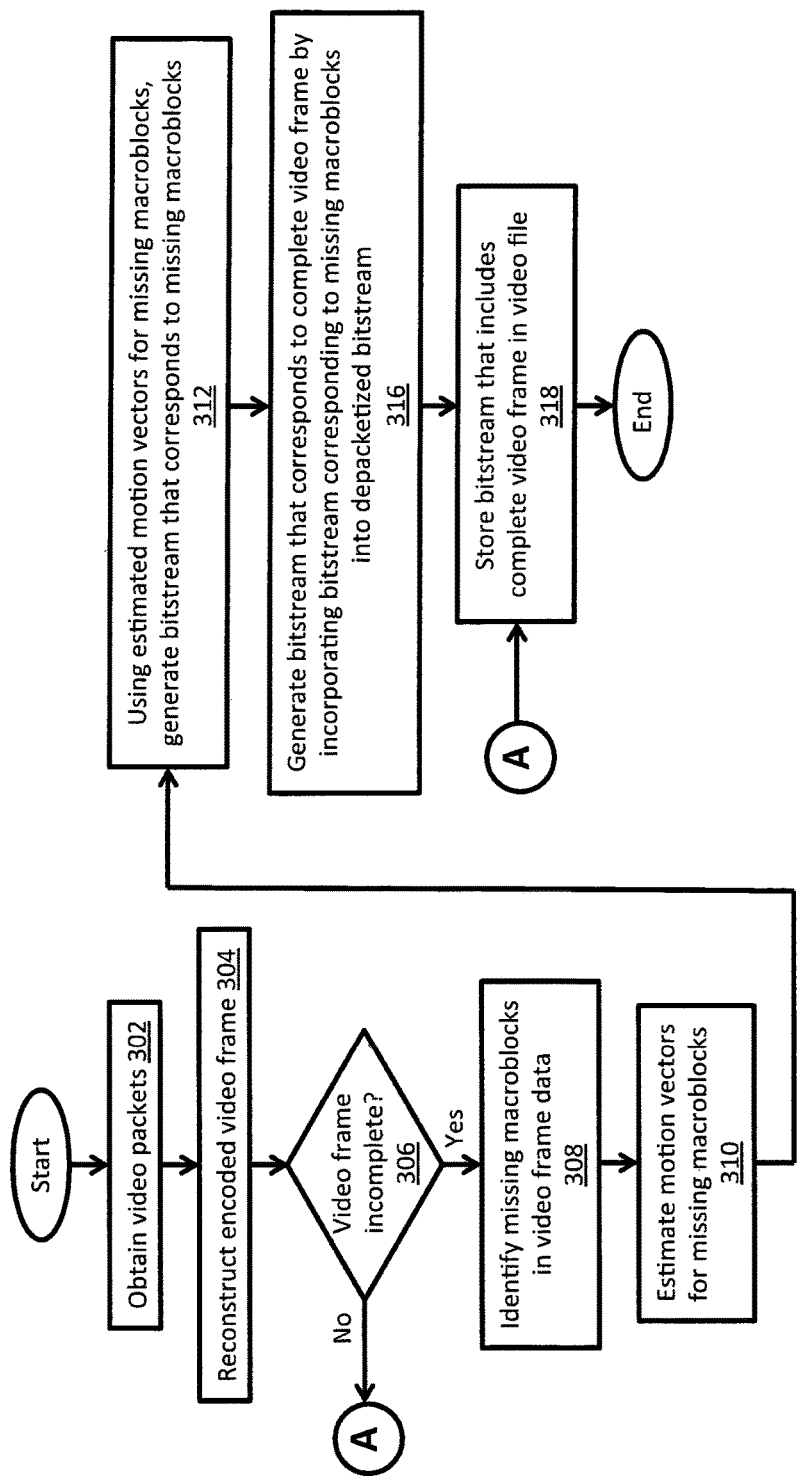
FIG. 3 is a flow diagram of an exemplary method of video recording in a real-time video communication using the system of FIG. 1a, in which error concealment is performed on incomplete video frames in the bitstream domain, prior to recording and storing a corresponding video frame bitstream in a video file.

FIG. 3 depicts an exemplary method of video recording in a real-time video communication using the system of FIG. 1a, in which error concealment is performed on incomplete video frames in the bitstream domain, prior to recording and storing encoded video frame data in a video file. For example, if an eventual packet loss is determined at the video receiver 104, such as by a determination that video packets received at the video receiver 104 have one or more missing video packets, possibly resulting in one or more incomplete video frames, then the error concealer 126 of the video recorder 122 may be employed to perform error concealment on the incomplete video frames in the bitstream domain, prior to recording and storing the encoded video frame data in a video file. As depicted in block 302, in a real-time video communication between the video sender 102 and the video receiver 104, one or more video packets are received, substantially in real-time, at the network adaptor 116 of the video receiver 104 over the network 106 from the video sender 102. The video packets are temporarily stored in the jitter buffer 124. As depicted in block 304, encoded video frame data are reconstructed from the video packets by the video depacketizer 118. As depicted in block 306, a determination is then made, by the depacketizer 118, as to whether the encoded video frame data is incomplete. For example, in determining whether the encoded video frame data is incomplete, the depacketizer 118 may determine whether one or more video packets are missing in the data of the encoded video frame. In the event the encoded video frame data is determined not to be incomplete (i.e., no video packets are missing from the data of the encoded video frame), the method of FIG. 3 can proceed from block 306 to block 318, in which a video frame bitstream that includes the video frame (such a video frame being a complete video frame) is recorded and stored by the video recorder 122 in a video file.

In the event the encoded video frame data is determined to be incomplete, the error concealer 126 of the video recorder 122 can perform error concealment on the incomplete video frame in the bitstream domain, as follows. First, the missing MBs in the data of the video frame are identified (see block 308), and motion vectors (MVs) are estimated for the missing MBs (see block 310). For example, the error concealer 126 can estimate such MVs for the missing MBs in the data of the video frame, using any suitable temporal error concealment technique. For the H.264 coding method, such a temporal error concealment technique can be used to identify missing MBs for P-frames and/or B-frames by estimating the MVs of the missing MBs from MVs of their neighboring MBs. Further, a boundary matching technique can be used to select the best MV estimate. Using the estimated MVs for the missing MBs, a video frame bitstream that corresponds to the missing MBs is generated (see block 312). The video frame bitstream that corresponds to the missing MBs is then incorporated into the depacketized video frame bitstream provided by the video depacketizer 118, thereby generating a video frame bitstream that corresponds to a complete video frame (see block 316). As depicted in block 318, a video frame bitstream that includes the concealed complete video frame is then recorded and stored by the video recorder 122 in a video file.

Figure 4:
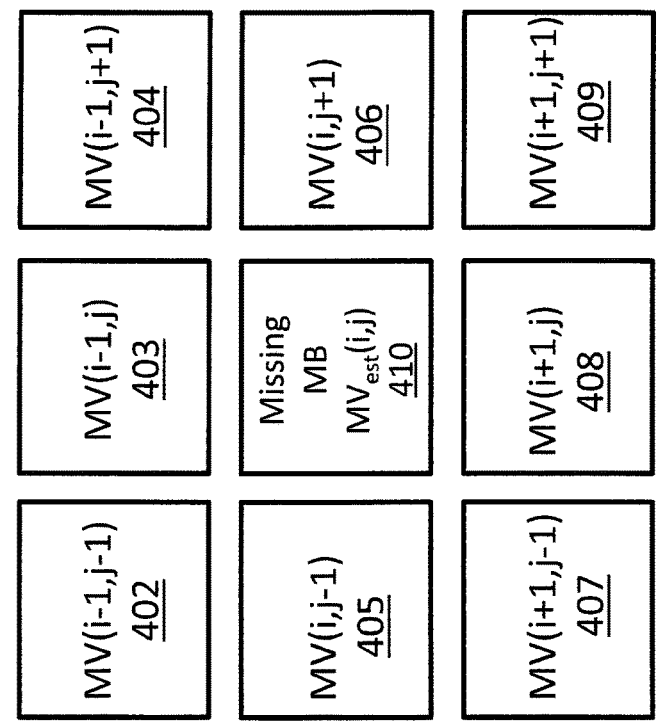

In one embodiment, motion vector (MV) estimation for a missing macroblock (MB) can be performed based on the motion vectors (MVs) of macroblocks (MBs) neighboring the missing MB in a current video frame, as well as MVs of the previous video frame and the next video frame. Further, a suitable frame delay can be employed to make the MVs of the MBs in the next video frame available. FIG. 4 depicts an exemplary set of MVs of MBs 402-409 in a current video frame 400, in which the respective MBs 402-409 are neighbors of a missing MB 410. In this embodiment, the estimated MV ("$MV_{est}$") of the missing MB 410 at coordinates (i, j) of the current video frame 400 can be expressed as a function of the MVs of the neighboring MBs 402-409, as well as the MVs of the previous video frame and the next video frame, as follows:

$$MV_{est}(i,j)=f(MV_{neighbors}, MV_{prev\_frame}, MV_{next\_frame}),\qquad(2)$$

in which "$MV_{neighbors}$" collectively corresponds to the MVs of the respective neighboring MBs 402-409, "$MV_{prev\_frame}$" corresponds to the MVs of the previous video frame, "$MV_{next\_frame}$" corresponds to the MVs of the next video frame, and "f( . . . )" can be a median function, a weighted average function, or any other suitable function. It is noted that the MVs used in MV estimation are dependent on the locations of the corresponding MBs, as well as the pattern of the missing MBs, in the current video frame. Further, if a scene change is detected in a video sequence, the MVs of MBs in video frames from a different scene are preferably not used in such MV estimation, in order to assure an acceptable level of MV estimation performance.

Figure 5A:
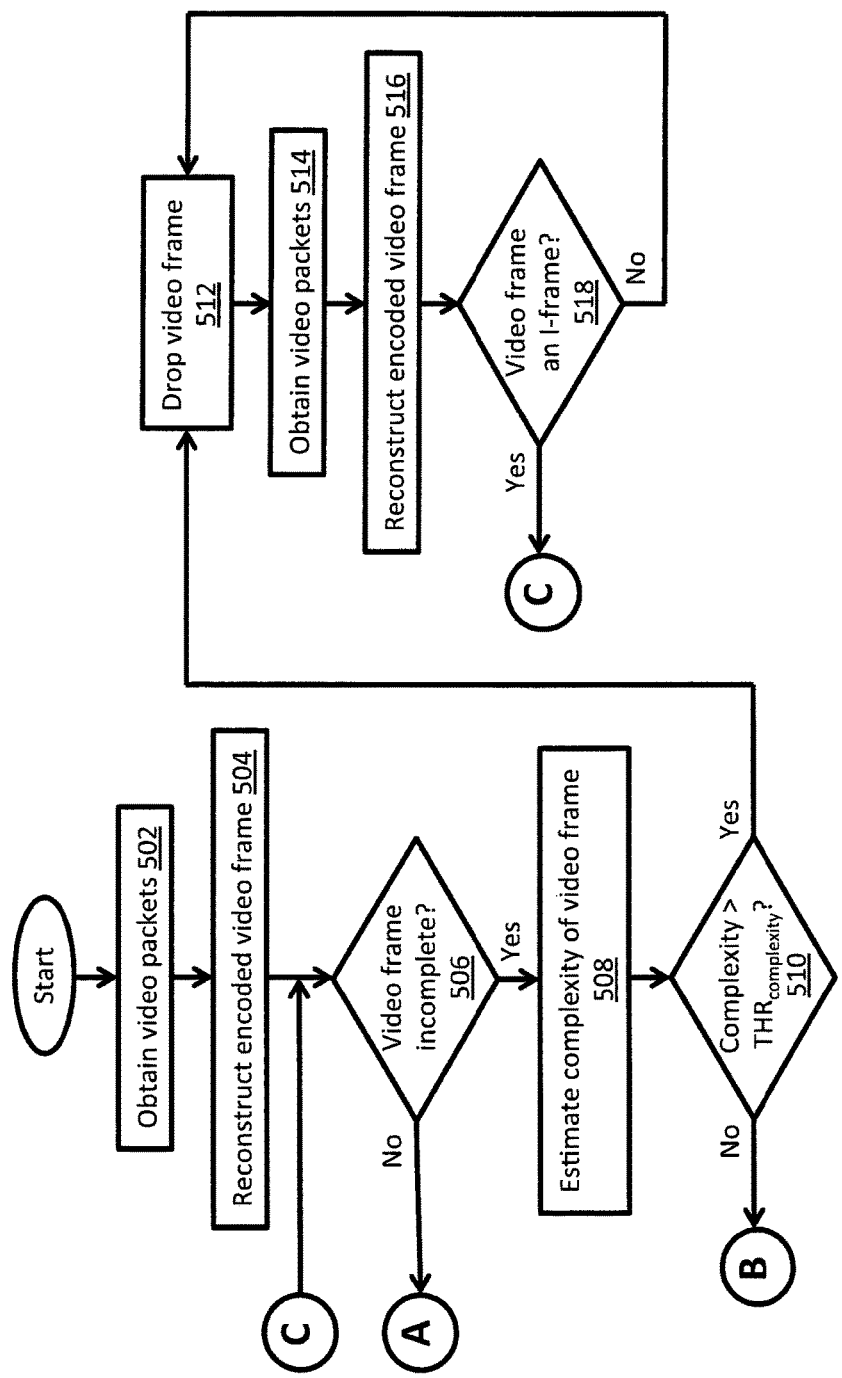
Figure 5B:
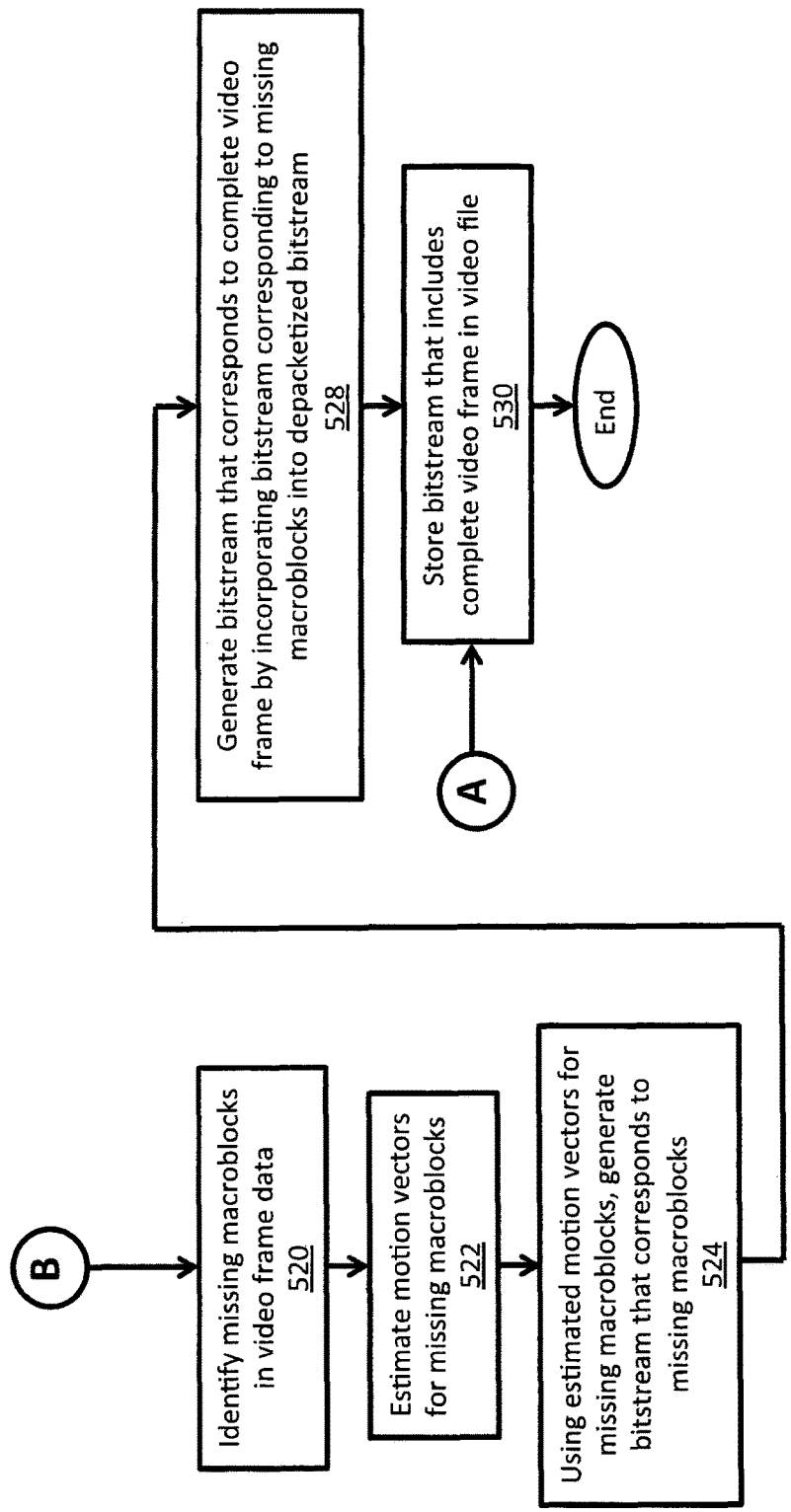

FIGS. 5a and 5b depict an exemplary method of adaptively performing error concealment on video frames in the bitstream domain, prior to recording and storing encoded video frame data in a video file, using the system of FIG. 1a. By adaptively performing such error concealment on video frames prior to recording and storing the encoded video frame data in a video file, based on estimates of the complexities of the respective video frames, visible artifacts in recorded real-time video communications during playback of the video file can be reduced. As depicted in block 502, in a real-time video communication between the video sender 102 and the video receiver 104, one or more video packets are received, substantially in real-time, at the network adaptor 116 of the video receiver 104 over the network 106 from the video sender 102. The video packets are temporarily stored in the jitter buffer 124. As depicted in block 504, encoded video frame data are reconstructed from the video packets by the video depacketizer 118. As depicted in block 506, a determination is then made, by the video depacketizer 118, as to whether the encoded video frame data is incomplete. In the event the encoded video frame data is determined not to be incomplete (i.e., no video packets are missing from the data of the encoded video frame), the method of FIGS. 5a and 5b proceeds to block 530 (see FIG. 5b), in which a video frame bitstream that includes the video frame (such a video frame being a complete video frame) is recorded and stored by the video recorder 122 in a video file.

In the event the encoded video frame data is determined to be incomplete, the error concealer 126 of the video recorder 122 can adaptively perform error concealment on the incomplete video frame in the bitstream domain, as follows. First, the complexity of the video frame is estimated (see block 508), using any suitable video frame complexity estimation technique. For example, the complexity of the video frame can be estimated using (1) the ratio of missing MBs to existing MBs in the respective video frame ("$R_{MB\_missing}$"), (2) the average quantization step size employed for the existing MBs in the respective video frame ("$QP_{avg}$"), (3) the average number of bits per MB ("$Bits_{MB\_avg}$"), (4) the average number of bits associated with MVs per MB ("$Bits_{MB\_MV\_avg}$"), and/or (5) the average number of bits associated with video transform coefficients per MB ("$Bits_{MB\_Coeff\_avg}$"). It is noted that the average number of bits associated with video transform coefficients per MB, $Bits_{MB\_Coeff\_avg}$, can be obtained as the difference between the average number of bits per MB, $Bits_{MB\_avg}$, and the average number of bits associated with MVs per MB, $Bits_{MB\_MV\_avg}$. Accordingly, the complexity of the video frame ("$Complexity_{frame}$") can be obtained, as follows:

$$Complexity_{frame}=g(R_{MB\_missing}, Bits_{MB\_MV\_avg}, Bits_{MB\_Coeff\_avg}, QP_{avg}).\qquad(3)$$

In one embodiment, the function, g( . . . ), in equation (3) can be expressed, as follows:

$$g(R_{MB\_missing}, Bits_{MB\_MV\_avg}, Bits_{MB\_Coeff\_avg}, QP_{avg})=\sqrt{R_{MB\_missing}}\times(\beta\times Bits_{MB\_MV\_avg}+Bits_{MB\_Coeff\_avg}\times QP_{avg}),\qquad(4)$$

in which "β" can be set to eight (8) or any other suitable value.

A determination is then made (see block 510) as to whether the complexity of the video frame exceeds a predetermined video frame complexity threshold, $THR_{complexity}$. In the event the complexity of the video frame does not exceed the predetermined video frame complexity threshold, $THR_{complexity}$, the error concealer 126 of the video recorder 122 performs error concealment on the incomplete video frame in the bitstream domain to generate a video frame bitstream that corresponds to a complete video frame. For example, the missing MBs in the data of the video frame are identified (see block 520), and motion vectors (MVs) are estimated for the missing MBs (see block 522), using any suitable temporal error concealment technique. Using the estimated MVs for the missing MBs, a video frame bitstream that corresponds to the missing MBs is generated (see block 524). The bitstream that corresponds to the missing MBs is then incorporated into the depacketized video frame bitstream provided by the video depacketizer 118, thereby generating a video frame bitstream that corresponds to a complete video frame (see block 528). As depicted in block 530, a video frame bitstream that includes the complete video frame is then recorded and stored by the video recorder 122 in a video file.

As depicted in block 512, in the event the complexity of the video frame exceeds the predetermined video frame complexity threshold, $\text{THR}_{complexity}$, the video frame is dropped by the error concealer 126 of the video receiver 104. As depicted in block 514, one or more video packets are further received, substantially in real-time, at the network adaptor 116 of the video receiver 104 over the network 106 from the video sender 102. The video packets are temporarily stored in the jitter buffer 124, and encoded video frame data are reconstructed from the video packets by the video depacketizer 118. As depicted in block 516, the encoded video frame data are then decoded and reconstructed to obtain a YUV video frame by the video decoder 120. As depicted in block 518, a determination is then made, by the error concealer 126 of the video recorder 122, as to whether the video frame is an I-frame. In the event the video frame is not an I-frame, the method of FIGS. 5a and 5b can loop back from block 518 to block 512, in which the video frame is dropped by the error concealer 126 of the video receiver 122. In the event the video frame is an I-frame, the method of FIGS. 5a and 5b can loop back from block 518 to block 506, in which a determination is made as to whether or not the I-frame bitstream is incomplete. Based on the determination as to whether or not the I-frame bitstream is incomplete, the error concealer 126 of the video recorder 122 adaptively performs error concealment on the incomplete I-frame in the bitstream domain (in accordance with blocks 508, 510, 512, 514, 516, 518, 520, 522, 524, and 528), or a video frame bitstream that includes the I-frame (such an I-frame being a complete video frame) is recorded and stored by the video recorder 122 in the video file (in accordance with block 530).

Figure 6:
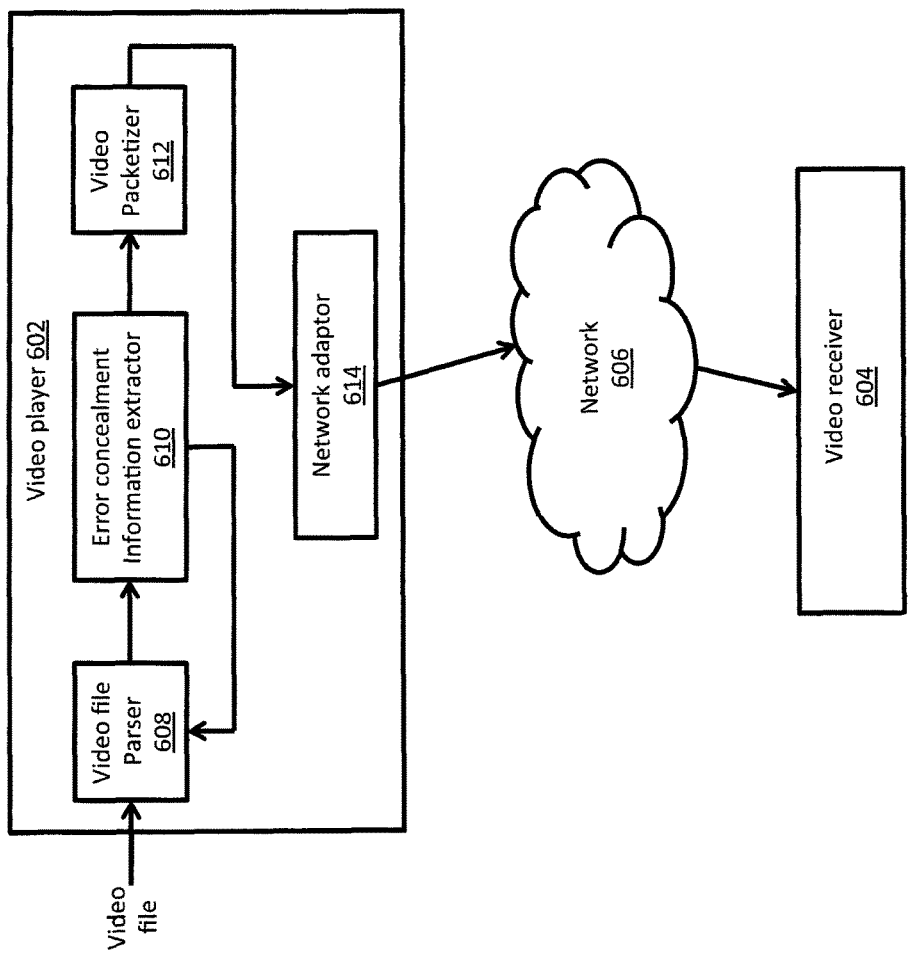
FIG. 6 is a block diagram of an exemplary system for playing back recorded real-time video communications between client devices, in accordance with the present application.

FIG. 6 depicts an illustrative embodiment of an exemplary system 600 for playing back recorded real-time video communications between client devices, in accordance with the present application. As shown in FIG. 6, the system 600 includes a client device functioning as a video player 602, and another client device functioning as a video receiver 604, in which the video player 602 and the video receiver 604 are communicably coupled to one another by at least one network 606 such as the Internet. The video player 602 includes a video file parser 608, an error concealment information extractor 610, a video packetizer 612, and a network adaptor 614. The video player 602 can receive, generate, or otherwise obtain a video file containing a recorded real-time video communication at the video file parser 608, which is operative to parse the video file to obtain data of at least one encoded video frame from a video frame bitstream stored in the video file. The error concealment information extractor 610 is operative to extract error concealment information, if any, from the data of the encoded video frame. For example, such error concealment information can include (1) the video frame type, (2) a flag that indicates whether or not the video frame was subjected to an error concealment process, and/or, (3) in the event the video frame was subjected to an error concealment process, the estimated complexity of the video frame. Such error concealment information can be stored in at least one predetermined field (e.g., a user data atom ('udta') field 704; see FIG. 7a) of a media container (e.g., a movie atom 702; see also FIG. 7a) of the received video file. The video packetizer 612 is operative to packetize the encoded video frame data into one or more video packets, and to provide the video packets to the network adaptor 614, which, in turn, is operative to transmit the video packets to the video receiver 604 over the network 606.

Figures 7A, 7B:
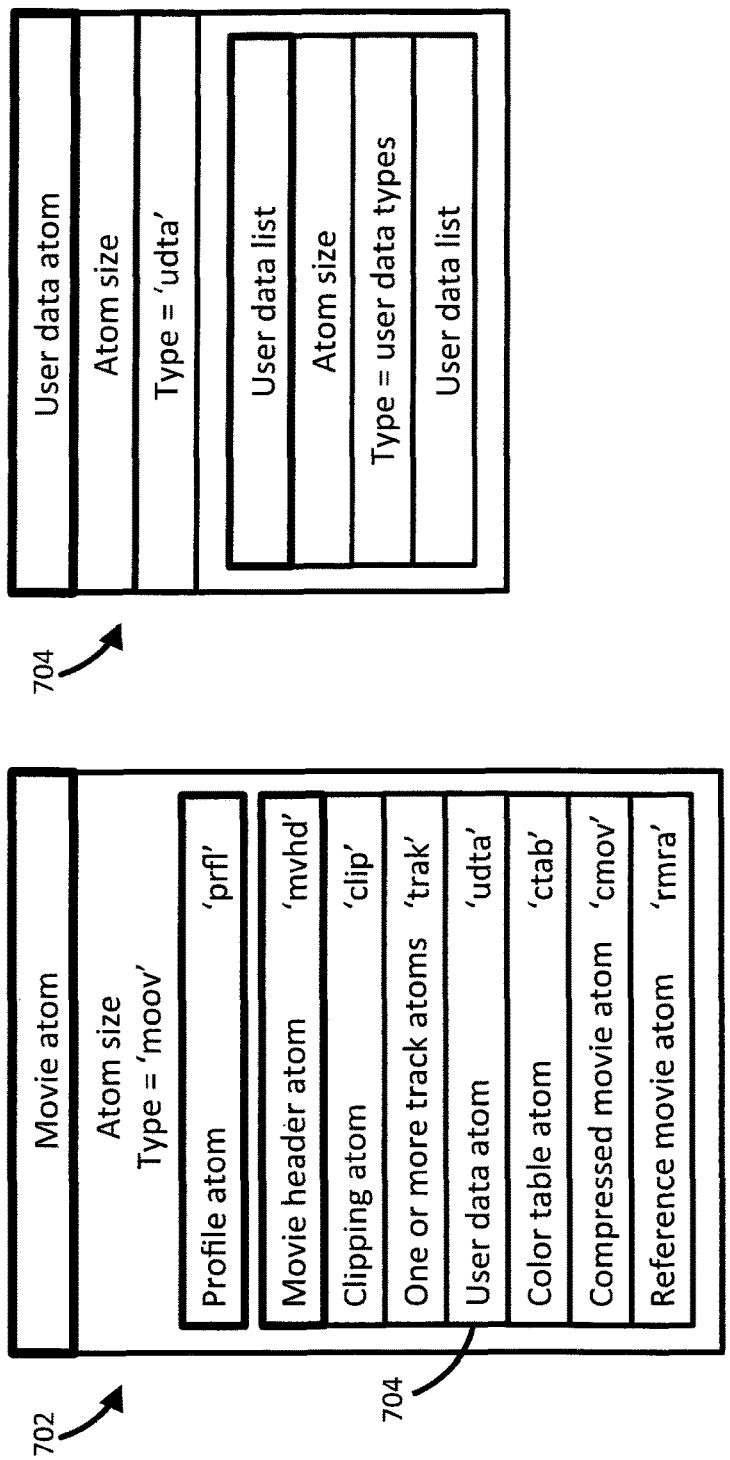
FIGS. 7a and 7b illustrate an exemplary media container of a video file for use with the system of FIG. 6.

FIG. 7a depicts an exemplary media container that conforms to the ".mov" file format, namely, the movie atom 702, for use in conjunction with the video file discussed herein with reference to the system 600 (see FIG. 6). It is noted, however, that such a media container can alternatively conform to the ISO media format, or any other suitable format. As shown in FIG. 7a, the move atom 702 includes the user data atom ('udta') field 704, which may be employed to store error concealment information (e.g., the video frame type, a flag that indicates whether or not the video frame was subjected to an error concealment process, the estimated complexity of the video frame) for the respective video frame. FIG. 7b depicts a detailed view of the user data atom ('udta') field 704 included in the movie atom 702. Once such error concealment information is stored in the user data atom ('udta') field 704 of the movie atom 702, the type of the error concealment information may be defined as the "user data type". In an alternative embodiment, such error concealment information for a video frame can be stored in a file separate from the video file containing the video frame.

Figure 8:
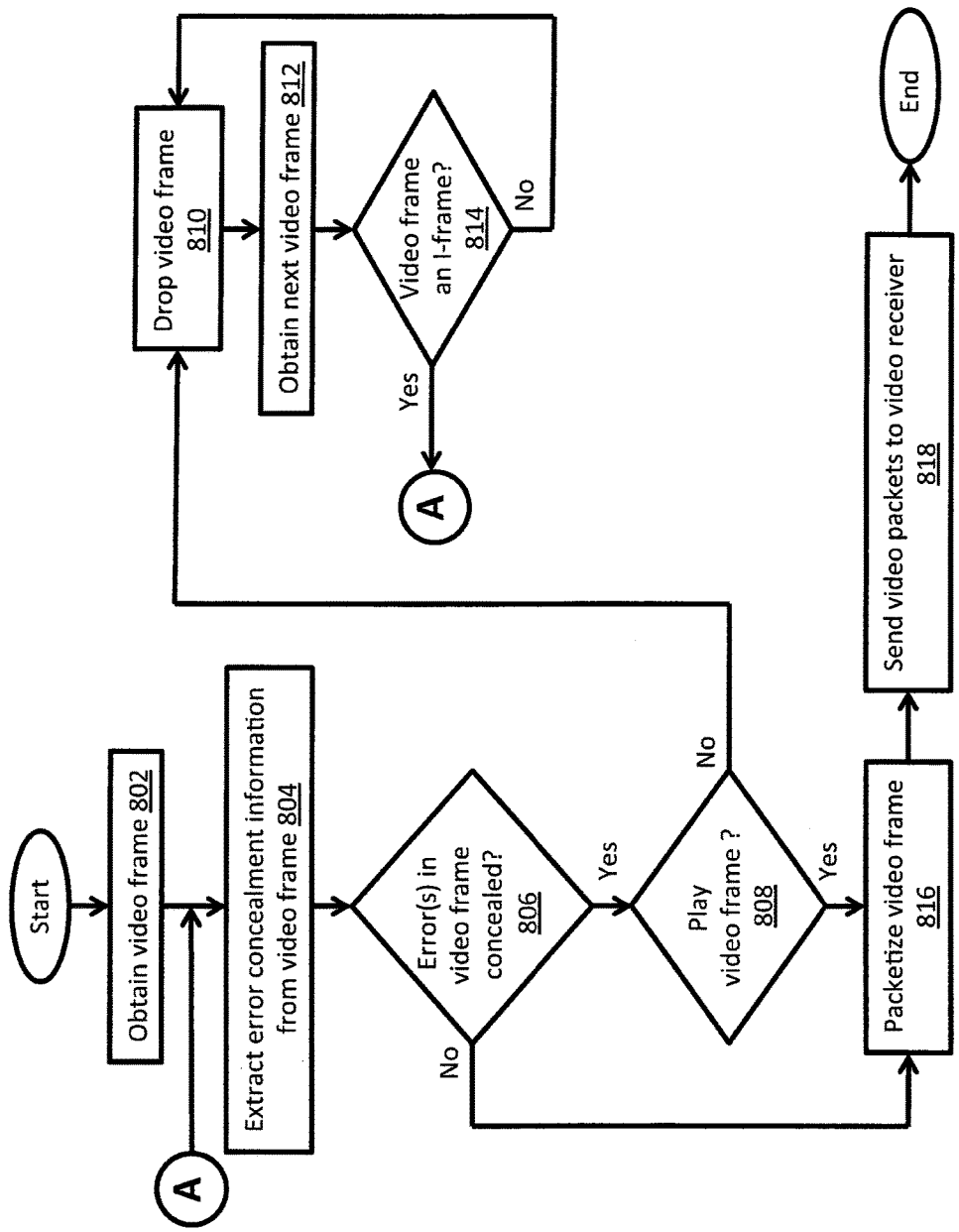
FIG. 8 is a flow diagram of an exemplary method of playing back a recorded real-time video communication using the system of FIG. 6.

FIG. 8 depicts an exemplary method of playing back a recorded real-time video communication using the system 600 of FIG. 6. As depicted in block 802, a video file containing the recorded real-time video communication is received at the video file parser 608 of the video player 602. The video file is parsed, by the video file parser 608, to obtain data of at least one encoded video frame from a bitstream stored in the video file. As depicted in block 804, error concealment information, if any, is extracted from the data of the encoded video frame by the error concealment information extractor 610. As depicted in block 806, a determination is then made, by the error concealment information extractor 610, as to whether error concealment was performed on the video frame, based on any error concealment information that was extracted from the data of the encoded video frame. As depicted in block 816, in the event error concealment was not performed on the video frame, the encoded video frame data is packetized, by the video packetizer 612, into one or more video packets, and the video packets are transmitted, by the network adaptor 614, to the video receiver 604 over the network 606.

As depicted in block 808, in the event error concealment was performed on the video frame, a determination is made, by the error concealment information extractor 610, as to whether (or not) to playback the recorded video frame. For example, the determination as to whether to playback the recorded video frame can be made based on the distance (in seconds) to the next I-frame, as well as the complexity of the video frame, each of which can be obtained from the stored error concealment information for the video frame, or determined from such stored error concealment information. In one embodiment, the decision not to playback the recorded video frame can be made if one of the following conditions is met:

$$\text{Complexity}_{frame} > D_{I\text{-}frame} \times \text{THR}_{drop}, \text{ if } D_{I\text{-}frame} > 0.5, \tag{5}$$

$$\text{Complexity}_{frame} > 2 \times \text{THR}_{drop}, \text{ otherwise}, \tag{6}$$

in which "$D_{I\text{-}frame}$" is the distance (in seconds) to the next I-frame, and "$\text{THR}_{drop}$" is a threshold value that can be set to sixty (60) or any other suitable value. It is noted that the next I-frame was unavailable when the concealed video frame was subjected to error concealment in the video recording process, while the next I-frame is available in the playback process, thereby allowing for better decision making in order to provide an improved video quality of experience to a human viewer during playback of the video.

In the event the determination is made to playback the recorded video frame, the method of FIG. 8 proceeds from block 808 to block 816, in which the encoded video frame data is packetized, by the video packetizer 612, into one or more video packets. As depicted in block 818, the video packets are then transmitted, by the network adaptor 614, to the video receiver 604 over the network 606. As depicted in block 810, in the event the determination is made not to playback the recorded video frame, the video frame is dropped by the error concealment information extractor 610. As depicted in block 812, data of at least one encoded video frame is further obtained, by the video file parser 608, from the video frame bitstream stored in the video file. As depicted in block 814, a determination is made, by the video file parser 608, as to whether the video frame is an I-frame. In the event the video frame is not an I-frame, the method of FIG. 8 loops back from block 814 to block 810, in which the video frame is dropped by the video file parser 608. In the event the video frame is an I-frame, the method of FIG. 8 loops back from block 814 to block 804, in which error concealment information, if any, is extracted from the data of the I-frame by the error concealment information extractor 610. As depicted in block 806, a determination is then made, by the error concealment information extractor 610, as to whether error concealment was performed on the I-frame, based on any error concealment information that was extracted from the data of the I-frame. Based on the determination as to whether error concealment was performed on the I-frame, the error concealment information extractor 610 determines whether or not to drop the I-frame (see blocks 808, 810), or the I-frame is packetized (see block 816) and transmitted (see block 818) over the network 706 to the video receiver 604.

It is noted that the operations herein described are purely exemplary and imply no particular order. Further, the operations can be used in any sequence when appropriate and can be partially used. With the above illustrative embodiments in mind, it should be understood that the above-described systems and methods could employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Moreover, any of the operations described herein that form part of the above-described systems and methods are useful machine operations. The above-described systems and methods also relate to a device or an apparatus for performing such operations. The apparatus can be specially constructed for the required purpose, or the apparatus can be a general-purpose computer selectively activated or configured by a software program stored in the computer. In particular, various general-purpose machines employing one or more processors coupled to one or more computer readable media can be used with software programs written in accordance with the teachings herein, or it may be more convenient to construct a more specialized apparatus to perform the required operations.

The above-described systems and methods can also be embodied as computer readable code on a computer readable medium. The computer readable medium is any data storage device that can store data, which can be thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of video decoding and recording in real-time video communications in a lossy network environment, comprising:

obtaining, at a video receiver, one or more video packets of a real-time video communication, the video receiver including a video decoder for decoding data of at least one video frame, and a video recorder for recording data of the at least one video frame;

determining whether the one or more obtained video packets of the real-time video communication have one or more missing video packets, the one or more missing video packets being indicative of a possible eventual packet loss at the video receiver;

having determined that the one or more obtained video packets of the real-time video communication have one or more missing video packets, transmitting, by the video receiver, at least one retransmission request for at least some of the missing video packets;

monitoring a time elapsed since transmission of the at least one retransmission request;

in the event the monitored time elapsed exceeds a first wait time threshold based on a first type of processing relating to the decoding of the data of the at least one video frame, determining a first occurrence of eventual packet loss relating to the decoding of the data of the at least one video frame; and in the event the monitored time elapsed exceeds a second wait time threshold based on a second type of processing relating to the recording of the data of the at least one video frame, determining a second occurrence of eventual packet loss relating to the recording of the data of the at least one video frame.

2. The method of claim 1 further comprising:

having determined the first occurrence of eventual packet loss relating to decoding the data of the at least one video frame, transmitting, by the video receiver, at least one request for an intra-coded video frame; and directing the video decoder to at least temporarily stop the decoding of the data until receipt of the requested intra-coded video frame at the video receiver.

3. The method of claim 2 further comprising:

upon the receipt of the requested intra-coded video frame, directing the video decoder to resume the decoding of the data of the at least one video frame in a real-time fashion.

4. The method of claim 1 further comprising:

having determined the second occurrence of eventual packet loss relating to recording the data of the at least one video frame, transmitting, by the video receiver, at least one request for an intra-coded video frame; and directing the video recorder to at least temporarily stop the recording of the data until receipt of the requested intra-coded video frame at the video receiver.

5. The method of claim 4 further comprising:
upon the receipt of the requested intra-coded video frame, directing the video recorder to resume the recording of the data of the at least one video frame in a non-real-time fashion.

6. The method of claim 1 wherein the second wait time threshold is greater than the first wait time threshold.

7. The method of claim 1 wherein the transmitting of the at least one retransmission request includes transmitting at least one Generic Negative Acknowledgement (GNACK) message.

8. The method of claim 1 wherein the transmitting of the at least one request for the intra-coded video frame includes transmitting at least one Picture Loss Indication (PLI) message.

9. The method of claim 1 further comprising:
in the event the one or more obtained video packets of the real-time video communication do not have one or more missing video packets, reconstructing data of at least one encoded video frame from the one or more video packets, and decoding the data of the at least one encoded video frame.

10. The method of claim 9 further comprising:
providing the at least one video frame in a video sequence for viewing on a display of a client device, or for re-encoding for transmission of re-encoded data to another client device.

11. The method of claim 1 further comprising:
in the event the obtained video packets of the real-time video communication do not have one or more missing video packets, recording, by the video recorder, the data of the at least one video frame in a video file.

* * * * *